United States Patent [19]

Tilliette

[11] Patent Number: 4,705,662

[45] Date of Patent: Nov. 10, 1987

[54] FAST NEUTRON NUCLEAR REACTOR WITH A STEAM GENERATOR INTEGRATED INTO THE VESSEL

[75] Inventor: Zéphyr Tilliette, Clamart, France

[73] Assignee: Commissariat a l'Energie Atomique, Paris, France

[21] Appl. No.: 732,742

[22] Filed: May 10, 1985

[30] Foreign Application Priority Data

May 11, 1984 [FR] France .................. 84 07332

[51] Int. Cl.⁴ .............................................. G21C 15/24
[52] U.S. Cl. ...................................... 376/405; 165/70; 165/141; 165/142
[58] Field of Search .......................... 165/70, 141, 142; 376/290, 291, 292, 367, 403, 404, 405

[56] References Cited

U.S. PATENT DOCUMENTS

| | | | |
|---|---|---|---|
| 3,868,994 | 3/1975 | Petrek | 165/142 |
| 3,907,026 | 9/1975 | Mangus | 165/142 |
| 3,967,591 | 7/1976 | Iida | 165/70 |
| 3,999,602 | 12/1976 | Fewell et al. | 165/70 |
| 4,140,176 | 2/1979 | Essebaggers | 165/142 |
| 4,560,533 | 12/1985 | Huebotter et al. | 165/70 |

FOREIGN PATENT DOCUMENTS

2015805 4/1971 France .
2055476 5/1971 France .
2228194 11/1974 France .

Primary Examiner—Deborah L. Kyle
Assistant Examiner—Richard L. Klein

[57] ABSTRACT

Fast neutron nuclear reactor of the type comprising a primary circuit integrated into a liquid metal-filled vessel and containing the reactor core, as well as means for circulating the said liquid metal and means for transferring the heat carried by the liquid metal to the water circulating in a water/steam circuit, wherein the heat transfer means comprise at least one steam generator located in the reactor vessel and having at least one group of inner tubes in which circulates the water of the water/steam circuit, at least one group of outer tubes immersed in the primary liquid metal, the outer tube surrounding each of the inner tubes in order to define therewith an annular space under a neutral gas pressure, connected to secondary circuit with a low thermal power having means for circulating this pressurized neutral gas, such as helium in said annular space and ensure the heat exchange.

12 Claims, 8 Drawing Figures

FAST NEUTRON NUCLEAR REACTOR WITH A STEAM GENERATOR INTEGRATED INTO THE VESSEL

BACKGROUND OF THE INVENTION

The present invention relates to a fast neutron nuclear reactor of the type comprising a primary circuit integrated into a liquid metal-filled vessel and containing the reactor core, as well as primary pumps for bringing about the circulation of said liquid metal and means for transferring the heat carried by the liquid metal to the water circulating in a water/steam circuit having means for converting said heat into electricity.

In existing reactors of this type, such as the French Phénix and Super-Phénix reactors, the heat carried by the liquid metal of the primary circuit (generally sodium) is transferred to the water of a water/steam circuit by an intermediate circuit, called the secondary circuit. A liquid metal (generally sodium) circulating in the secondary circuit removes the heat carried by the primary liquid metal in heat exchangers integrated into the reactor vessel and transfers it to the water of the water/steam circuit by steam generators outside the vessel.

In these reactors, the liquid metal secondary circuit is provided so that there is no risk of contact taking place between the sodium of the primary circuit and the water of the water/steam circuit within the actual reactor vessel. Thus, it is known that a violent reaction is brought about by contact between the sodium and the water. In a fast neutron nuclear reactor, such a contact can occur at the steam generators. In order to prevent the shock wave resulting from a sodium - water reaction having repercussions up to the reactor core, it has been decided to position the steam generators outside the reactor vessel.

In parallel, the existing reactors such as the French Phénix and Super-Phénix reactors are of the integrated type, in which the complete primary circuit is confined within the reactor vessel. This option has been chosen to take account of the fact that it is always preferable to confine a radioactive primary circuit both for radiation protection and security reasons.

Bearing in mind these two opposing requirements, the existing integrated fast neutron reactors consequently comprise an intermediate liquid metal circuit, so that costs are significantly increased.

Therefore, consideration has been given to the elimination of the intermediate liquid metal circuit by removing the primary circuit from the reactor vessel. However, this solution is not completely satisfactory, due to the high radioactivity of the fission products entrained by the primary liquid metal.

SUMMARY OF THE INVENTION

The object of the present invention is a fast neutron nuclear reactor maintaining the integration of the primary circuit within the reactor vessel, whilst making it possible to eliminate the conventional intermediate liquid metal circuit through the use of a novel type of steam generator, which can be placed within the reactor vessel without a sodium - water reaction occurring at this level.

The present invention therefore proposes a fast neutron nuclear reactor of the type comprising a primary circuit integrated into a liquid metal-filled vessel and containing the reactor core, as well as means for circulating the said liquid metal and means for transferring the heat carried by the liquid metal to the water circulating in a water/steam circuit, wherein the heat transfer means comprise at least one steam generator located in the reactor vessel and having at least one group of inner tubes in which circulates the water of the water/steam circuit, at least one group of outer tubes immersed in the primary liquid metal, the outer tube surrounding each of the inner tubes in order to define therewith an annular space under a neutral gas pressure, connected to a secondary circuit with a low thermal power having means for circulating this pressurized neutral gas, such as helium in said annular space and ensure the heat exchange.

As a result of these characteristics, liquid metal - neutral gas exchangers, rather than steam generators in the normal sense of the term, are integrated into the interior of the reactor vessel. Thus, the security requirements are satisfied and the costs for such a reactor are significantly reduced.

According to a preferred embodiment of the invention, the reactor vessel is sealed by a horizontal sealing slab tightly passing through the steam generator, whereby the latter is provided above said slab with an upper tube plate supporting the group of inner tubes and open at their inner end, an intermediate tube plate surmounted by a steam discharge chamber of the water/steam circuit and supporting a group of intermediate tubes surrounding the inner tubes, closed at their lower ends and into the base of which issue the inner tubes, and a lower tube plate surmounted by a neutral gas discharge chamber and supporting the group of outer tubes surrounding the intermediate tubes, the steam generator also having neutral gas tubes connecting the bottom of the outer tubes to neutral gas inlet ports located between the lower tube plate and the sealing slab.

In such a structure, it should be noted that all the tubes are suspended independently of one another on corresponding tube plates and are free to expand downwards. The mechanical reliability of the tubes and the steam generator is consequently improved.

In the same way, although the lower ends of the outer tubes are connected to neutral gas tubes, the expansion of said outer tubes is also made possible by the fact that each of the neutral gas tubes preferably has a substantially horizontal part with an adequate length and reduced diameter and consequently a high expansion compensation capacity, positioned in the lower part of the apparatus.

According to the invention, it is also necessary to note that the conventional jacket or casing of steam generators is eliminated and is replaced by a liquid metal confinement ferrule which has a limited thickness. This very simply designed ferrule is placed below the lower tube plate and encircles the groups of inner, intermediate and outer fitted tubes. It has an inlet for the liquid metal positioned above the normal level of said liquid metal in the reactor vessel and is open at its lower end to permit the discharge of the liquid metal. Thus, a satisfactory exchange height can be obtained without increasing the reactor vessel height.

Moreover, the integration of steam generators having an intermediate neutral gas outflow within the reactor vessel makes it possible to eliminate the cooling exchangers of the reactor on shutdown. Thus, this reactor cooling function during the stoppage of the primary pumps can be fulfilled by the liquid metal - neutral gas exchanger part of each of the steam generators.

In order that a circulating of the liquid metal by natural convection can then take place within the ferrule in the case of a stoppage of the primary pumps, the ferrule also has, below the normal liquid metal level in the reactor vessel, entry windows which are either normally sealed, to control means controlling the automatic opening of these windows during the stoppage of the primary pumps, or calibrated in such a way that under normal or rated operating conditions they only permit the passage of a reduced primary sodium flow.

Preferably, the steam generator has a dismantlable part comprising the upper tube plate, the inner tube group, the intermediate tube plate, the steam discharge chamber and the intermediate tube group. This arrangement facilitates the manufacture in the factory, transportation, in site installation and in particular in service inspections, as well as subsequent checks or repairs to vertical outer tubes constituting the main tubes of the steam generator.

In order to improve the thermal efficiency of the steam generators, each of the inner tubes preferably has two coaxial walls defining between them an annular zone sealed at one of its ends and filled with a fluid forming a heat shield.

According to a first constructional variant according to the invention, the upper tube plate is surmounted by a water intake chamber of the water/steam circuit. The annular zone formed between the walls of each of the inner tubes is then sealed at its upper end, open at its lower end and filled with stagnant steam/water, with a low heat exchange.

According to a second constructional variant of the invention, the upper tube plate forms the upper base of the steam generator, the inner walls of the inner tubes are extended above the upper tube plate to issue into the water intake of the water/steam circuit. The annular zone formed between the walls of each of the inner tubes is then closed at its lower end, open at its upper end and filled with a stagnant gas, such as air above the reactor slab.

In order to reduce the speed of the water at the bottom of each inner tube before it rises into the corresponding intermediate space, the lower end of the inner wall of each of the inner tubes is positioned above the lower end of the outer wall of each of these tubes.

The water/steam circuit in conventional manner comprises a steam turbine, the secondary circuit preferably comprises a resuperheater ensuring a transfer of the heat carried by the neutral gas of said circuit to the steam to be resuperheated, before the latter is admitted into the corresponding part of the turbine.

As a variant, consideration can be given to a secondary neutral gas circuit confined within the reactor building. In this case, the quantity of heat carried away out of the main steam generator can e.g. be used for additional live steam production and for additional reheating of the feed water.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
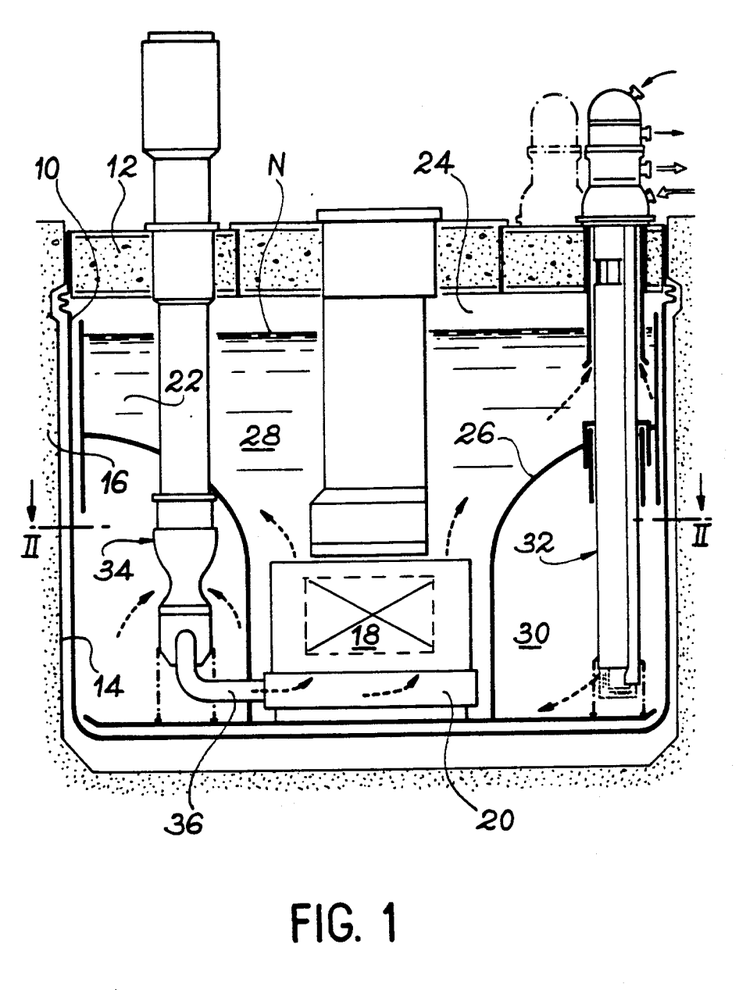
FIG. 1 a cross-sectional view diagrammatically showing a fast neutron nuclear reactor comprising steam generators integrated into the vessel according to the invention.

FIG. 1 diagrammatically shows the integrated primary circuit of a fast neutron nuclear reactor constructed in accordance with the invention. In per se known manner for an integrated fast neutron nuclear reactor, FIG. 1 shows that the complete primary circuit of the reactor according to the invention is placed within a vertically axed cylindrical vessel 10, called the main vessel, which is sealed at its upper end by a concrete-filled sealing slab 12. The main vessel 10 and its sealing slab 12 are placed in a vessel well or shaft 14 formed in a concrete enclosure 16. In per se known manner, vessel 10 can be supported either by placing it on the bottom of the vessel shaft 14, or by suspending the vessel on the upper part of the vessel shaft, as illustrated in FIG. 1.

The reactor core 18 is placed in the central part of vessel 10 and rests on the bottom of the latter via a support structure having a support member 20, which also serves to supply the core with liquid sodium.

Vessel 10 is filled up to a level N with a certain volume of liquid metal 22, generally constituted by sodium. The sodium 22 is surmounted by a covering of neutral gas 24, generally constituted by argon. An inner vessel 26, e.g. having a step, defines within the main vessel 10 a hot collector 28 positioned above core 18 and vessel 26 and an annular cold collector 30 surrounding core 18.

According to the invention, a certain number of steam generators 32 traverse the sealing slab 12 and pass into the peripheral part of the main vessel 10, whilst passing through the inner vessel 26. The hot sodium leaving the reactor core 18 and entering the hot collector 28 penetrates the steam generators 32. On passing through the latter, it cools by heat exchange with the water of the water/steam circuit, before passing out into the cold collector 30. In per se known manner, the reactor also comprises a certain number of primary pumps 34 placed within the cold collector 30. These primary pumps 34 suck the relatively cold primary sodium transferred into collector 30 by steam generators 32 and then deliver it to the supply support member 20 of reactor vessel 18 by means of pipes 36.

Figure 2:
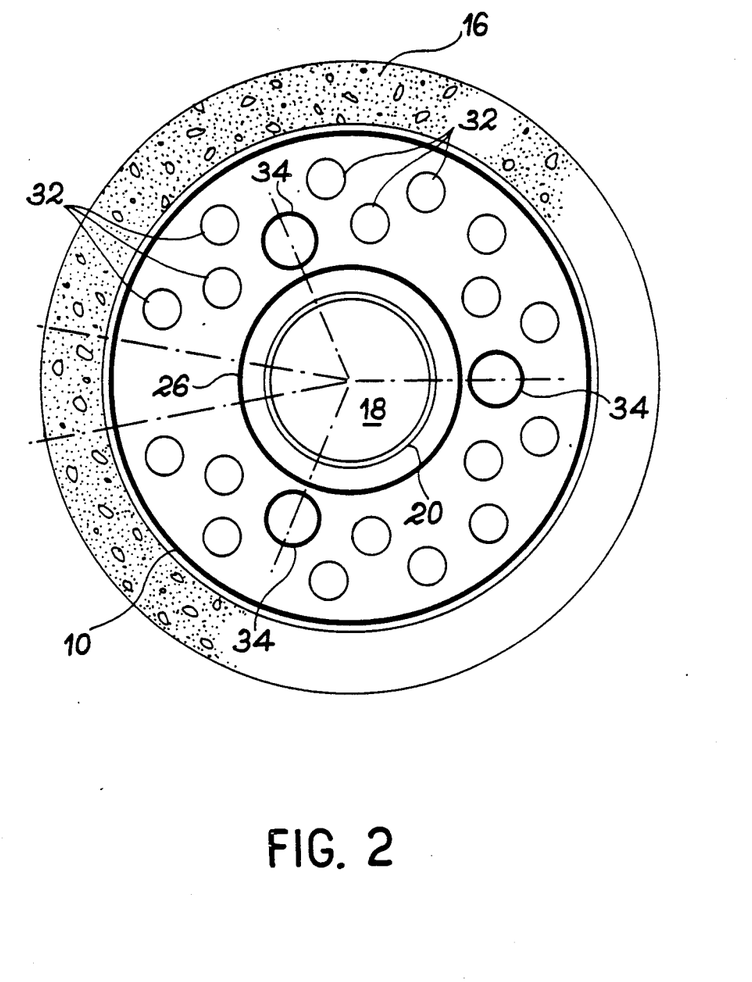
FIG. 2 a plan view in section along line II—II of FIG. 1.

As is more particularly illustrated in FIG. 2, the aforementioned primary circuit can comprise three primary pumps 34, six steam generators being associated with each of these pumps. However, this construction is obviously not limitative and a different number of pumps and steam generators can be considered.

As in existing integrated reactors, the components within the reactor vessel, i.e. the steam generators 32 and pumps 34 can be supported either by suspending these components on the sealing slab 12, or by having them rest on the bottom of vessel 10, as is diagrammatically shown in FIG. 1.

Figure 3:
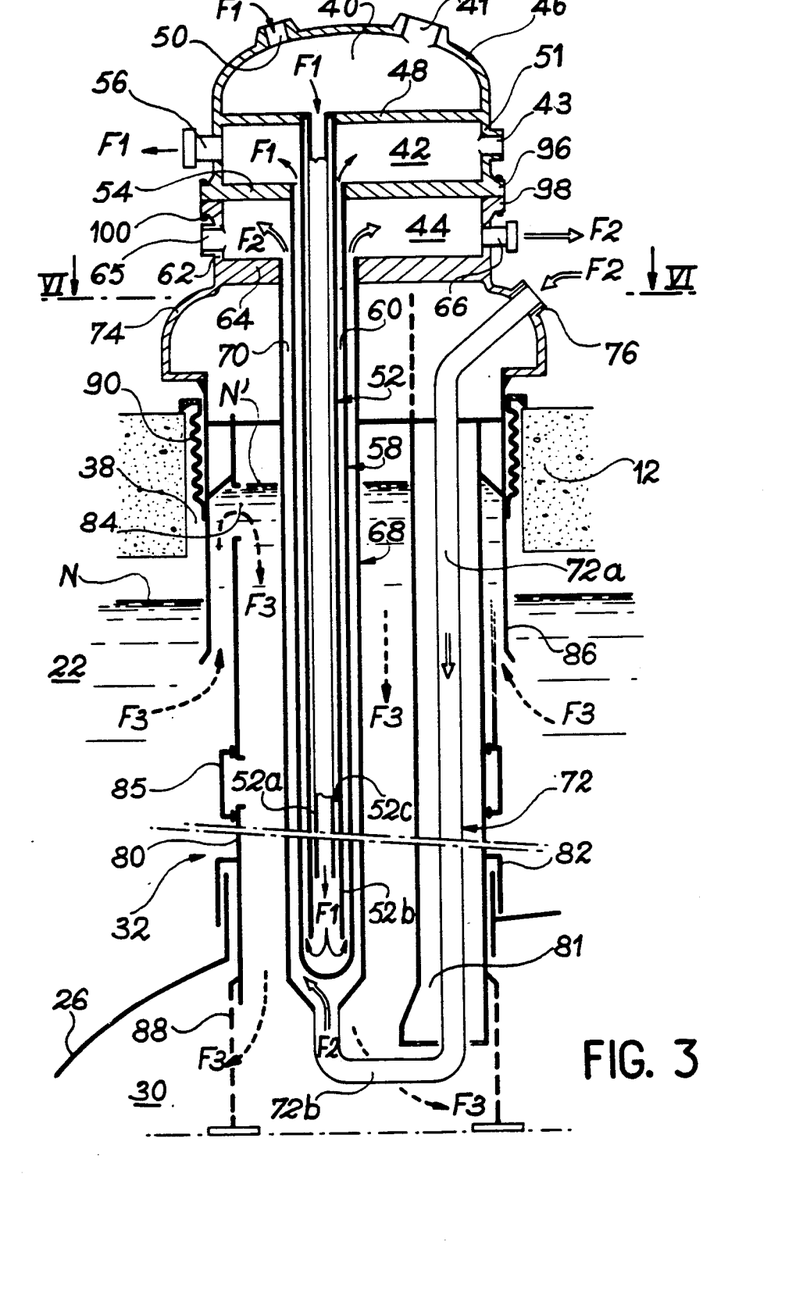
FIG. 3 a diagrammatic longitudinal section view of a steam generator of the reactor shown in FIGS. 1 and 2, illustrating one of the elementary tubular cells of the generator at a scale which has been deliberately increased in order to facilitate the understanding thereof.

With reference to FIG. 3, a description will now be given of a preferred embodiment of the steam generator 32. Thus, it can be seen in FIG. 3 that the steam generator 32 has a generally vertical configuration and passes through a passage 38 formed in slab 12, so that the actual exchange zone is introduced directly into the sodium 22 contained in the reactor vessel, whereas the connection of the steam generator to the water/steam circuit of the reactor and to a neutral gas secondary circuit is brought about by a part of the generator positioned above slab 12.

Said part of the steam generator positioned above slab 12 and which constitutes the head of said component comprises, starting from the top, a water intake chamber 40, a steam discharge chamber 42 and a helium discharge chamber 44, in the considered example where helium constitutes the chemically neutral gas ensuring the heat transfer between the primary sodium and the water of the water/steam circuit. However, the chemically neutral gas can be of a different nature and can even be a gaseous mixture.

The water intake chamber 40 is formed between the upper dome 46 of the steam generator and an upper horizontal tube plate 48. Dome 46 carries a water intake pipe 50, which is used for connecting the chamber 40 to the water/steam circuit, as will be shown hereinafter.

The upper tube plate 48 supports a group of vertical straight tubes 52, which are open at their lower ends and extend freely downwards from plate 48 to the interior of the reactor vessel.

The steam discharge chamber 42 is formed within a cylindrical wall 51 extending dome 46 downwards between the upper tube plate 48 and an intermediate horizontal tube plate 54. A steam discharge pipe 56 is provided in wall 51 to permit the connection of the steam discharge chamber 42 to the water/steam circuit.

The intermediate tube plate 54 supports a group of vertical straight tubes 58, called intermediate tubes and which are arranged coaxially around each of the inner tubes 52, so as to define with the latter annular passages 60.

As is shown in FIG. 3, the intermediate tubes 58 are sealed at their lower ends, in the vicinity of which issue the inner tubes 52. A circulation of water and then steam takes place from the water intake chamber 40 to the steam discharge chamber 42. Thus, the water admitted into chamber 40 descends within the inner tube 52, before rising through annular spaces 60 up to the steam discharge chamber 42, as illustrated by the arrows $F_1$ in FIG. 3.

The helium discharge chamber 44 is also formed within a cylindrical wall 62 positioned in the extension of wall 51 and is defined between the intermediate tube plate 54 and a horizontal lower tube plate 64. A discharge pipe 66 formed in wall 62 makes it possible to connect the helium discharge chamber 44 to the helium circuit which will be described hereinafter.

The lower tube plate 64 supports a third group of vertical straight tubes 68 positioned coaxially around each of the intermediate tubes 58, so as to define with the latter a second series of annular spaces 70.

As is shown in FIG. 3, the outer tubes 68 are extended downwards slightly beyond the bottom of the intermediate tubes 58, so as to be connected to helium intake tubes 72 having a reduced diameter and used for introducing the helium through the bottom of each of the tubes 68, so that this neutral gas rises through the annular spaces 70 into the helium discharge chamber 44.

Although it is theoretically possible to envisage the introduction of the helium by tubes 72 preferably passing through the bottom of the reactor vessel, the most realistic solution shown in FIG. 2 consists of raising the tubes 72, outside the actual exchange group, to above slab 12, in order to ensure the independence of the generator from the main vessel.

In practice, FIG. 3 shows that the steam generator has for this purpose a widened area defined by a widened wall 74, which extends downwards from the lower tube plate 64 to the vicinity of the upper face of sealing slab 12. A certain number of helium intake pipes 76 (12 in the embodiment shown in FIG. 6) are installed on wall 74 and support small tube plates 78, to each of which are connected a certain number of tubes 72. These tubes 72 are then grouped and extend by a vertical straight portion 72a down and along the exchange group. This straight portion 72a is extended below the lower end of the outer tubes 68. It is connected to the lower end of the outer tubes 68 by a substantially horizontal portion 72b located below the lower end of tubes 68. Portion 72b permits a certain differential expansion between outer tube 68 and the helium intake tubes 72. The circulation of helium within the steam generator is diagrammatically represented by arrow $F_2$ in FIG. 3.

The exchange structures of the steam generators 32 used in the reactor according to the invention are consequently constituted by a group of elementary vertical tubular cells introduced into the liquid sodium 22 contained in the reactor vessel 10. In this structure, tubes 52, 58 and 68 constituting each of the said tubular cells are independent of one another, particularly from the standpoint of the differential expansions between the tubes and between the group and its outer casing. This feature is of fundamental importance for the mechanical reliability of the tubes and the steam generators overall. Associated with the use of a chemically neutral intermediate fluid, such as helium circulating between the sodium and the water/steam and at a temperature between that of these two fluids, it makes it possible to obtain steam generators with high mechanical integrity and reliability.

Moreover, this so-called plunging tube structure makes it possible to obtain an acceptable thermal efficiency for an exchange height permitting the installation of steam generators within the reactor vessel. Thus, for a reactor of 1500 MWe with steam generators integrated into a main vessel with an internal diameter below or equal to 25 m and a height below or equal to 18.5 m, for each generator there is a heat exchange height between 15 and 17 m and an external diameter of the group of approximately 1.75 m. The tube length would be reduced if the inner tubes 58 had fins placed in annular spaces 60 by which the steam rises.

In order to provide a good understanding of the structure of the steam generator used in the reactor according to the invention and particularly in order that the circulations of the different fluids in the tubes are more readily apparent, FIG. 3 shows a single elementary tubular cell, by considerably increasing the diameter of the tubes forming said cell compared with the dimensions of the steam generator. Obviously, in practice, there are numerous elementary cells of the type shown in FIG. 3. These different cells define the actual exchange zone of the steam generator.

In order to channel the outflow of sodium 22 around the various tubular cells of the steam generator, the latter also has a ferrule 80 encircling the group of tubular cells, whereby said ferrule can e.g. be connected to the widened part 74 of the head of the steam generator. Ferrule 80 tightly traverses the inner reactor vessel 26, via an argon chamber sealing system 82.

The sodium contained in the hot collector 28 enters the ferrule 80 via intakes 84 formed therein. Preferably, the intakes 84 are positioned above the level N of sodium 22 in the reactor vessel, in such a way that the sodium level N' within the steam generator is higher than said level N. Thus, it is possible to significantly increase the heat exchange length between the sodium and the water of the water/steam circuit, which makes it possible, as stated hereinbefore, to limit the height of the reactor vessel to a reasonable value. The use of gilled or finned steam-helium tubes makes it possible to maintain the entry level of the sodium into the steam generator immediately below the main vessel, with a view to ensuring a better thermal protection of the latter. The circulation of sodium from the hot collector 28 to the inlets 84 takes place within a collar 86 introduced into sodium 22 and surrounding the ferrule 80 to above the inlets 84.

In the lower part of the steam generator, the sodium flows out into the cold collector 30 directly via the lower open end of ferrule 80. The sodium circulation in the steam generator is diagrammatically represented by the arrows $F_3$ in FIG. 3.

In addition, the circulation of helium in the intermediate space 70 can make it possible to discharge residual heat dissipated in the reactor core, in the case of a stoppage of primary pumps 34 (FIG. 1). The cooling exchangers of the reactor when shut down and which are conventionally used can consequently be eliminated. In order that there can be a circulation of sodium 22 by natural convection within ferrule 80, on the latter and below sodium level N is provided a normally closed entry window 85. The opening of this window is automatically controlled when the pumps 34 are stopped. As a variant, calibrated windows only permit the passage of a reduced primary sodium flow under normal operating conditions and can also be used.

FIG. 3 diagrammatically shows a first possible way of supporting steam generator 32, in which the latter rests directly on the bottom of reactor vessel 10. This supporting action, which makes it possible to prevent overloading of the sealing slab 12, takes place by means of a ferrule or legs 88 fixed to the lower end of the ferrule 80 and resting directly or indirectly on the bottom of the reactor vessel. In order to take account of the differential expansion, the sealing at the point where the steam generator traverses slab 12 is e.g. brought about with the aid of a bellows system 90, whose ends are respectively fixed to the slab and to collar 86.

Preferably and as is also illustrated in FIG. 3, the upper part of the steam generator carrying the inner and intermediate tubes 52, 58 is dismantlable, so that it is easier to control and inspect the outer tubes 68 which are the only ones which are in direct contact with the primary sodium. For this purpose, the intermediate tube plate 54 is extended outwards beyond wall 52, in order to form a flange 96 resting on a flange 98 formed at the upper end of wall 62. These two flanges are fixed tightly to one another by per se known fixing means and in particular by bolts 100 traversing holes regularly distributed over the circumference of flanges 96, 98.

Figure 4:
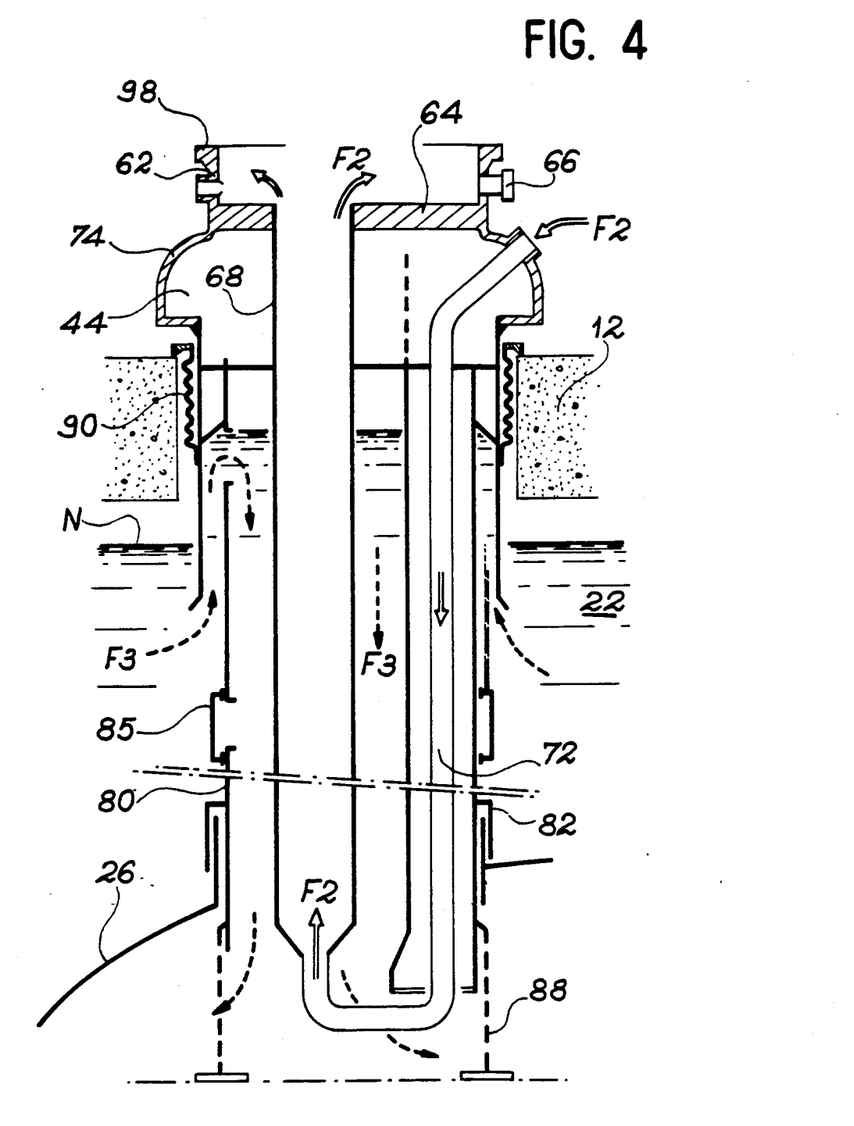
FIG. 4 a view comparable to FIG. 3 showing the steam generator after removing the dismantlable steam - water part thereof.

FIG. 4 is a view comparable to that of FIG. 3 showing the configuration of the exchanger after removing the upper dismantlable part incorporating the water intake chamber 40 and the steam discharge chamber 42, as well as the inner and intermediate tubes 52, 58 associated therewith. FIG. 4 shows that there is a completely free access to outer tubes 68.

This possibility of dismantling the steam generator also has the advantage of facilitating the manufacture of the generator in the factory, its transportation, its on site installation, together with subsequent checks and repairs.

Moreover, an inspection of each of the tube plates is also made possible by the access ports 41, 43 and 45 respectively formed in the dome 46 and in walls 51 and 62.

It was stated hereinbefore that the water of the water/steam circuit descends by inner tubes 52 before rising again into the annular spaces 60 defined around the said tubes. Thus, there is a possibility of a parasitic heat exchange between the relatively cold water entering by tubes 52 and the steam rising again via spaces 60.

In order to greatly reduce this parasitic heat exchange, outer tube 52 has two coaxial walls 52a, 52b defining between them an annular zones 52c. In the embodiment of FIG. 3, this annular zone is sealed at its upper end level with the tube plate 48 and is open at its lower end. It is consequently filled with stagnant steam and water ensuring a satisfactory thermal insulation, particularly in the upper part of the group, in which such insulation is particularly necessary.

In the preferred embodiment shown in FIG. 3, the outer wall 52b of the inner tube 52 is extended downwards beyond its inner wall 52a, which enables the water reaching the lower end of the tubes to undergo a speed reduction. The latter is favourable to the change of direction of the water occurring in the bottom of the intermediate tubes 58.

Figure 5:
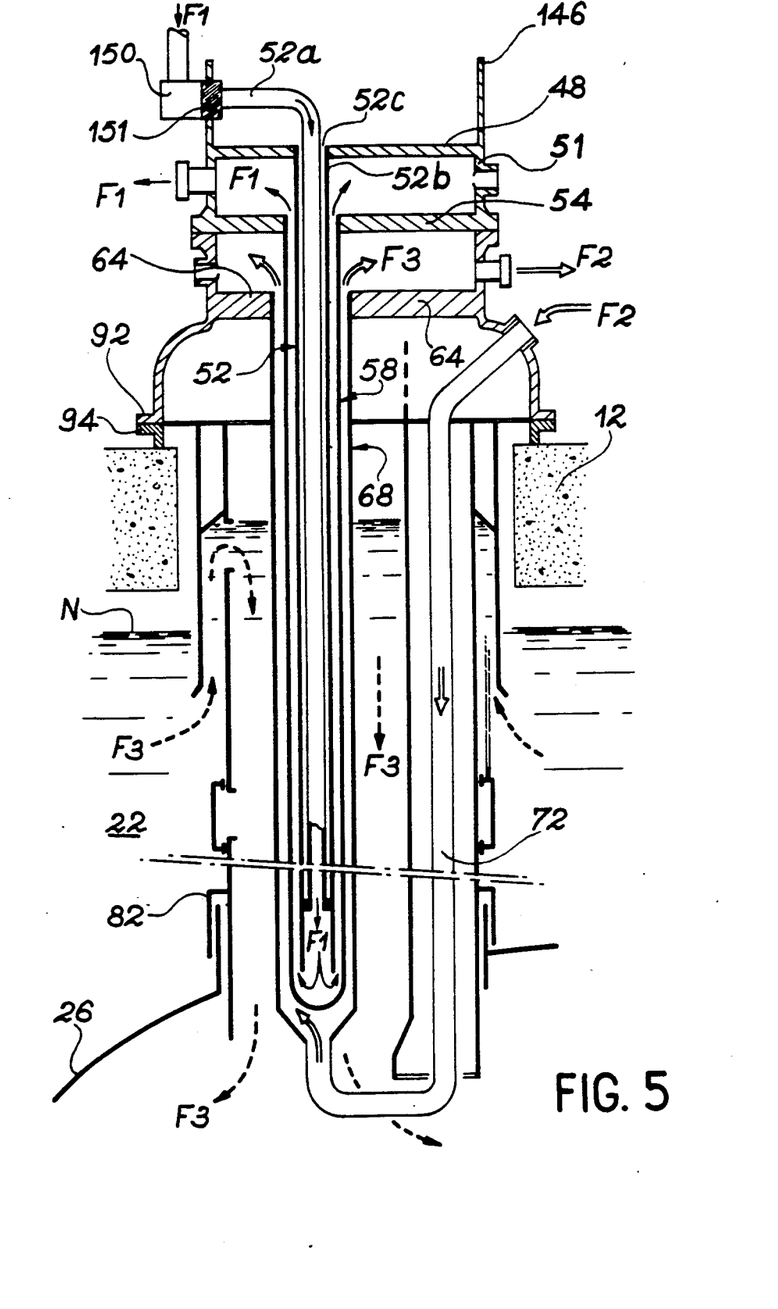
FIG. 5 a view comparable to FIG. 3 illustrating a constructional variant of the steam generator which can be used in the reactor according to the invention.

In a constructional variant shown in FIG. 5, the inner tubes 52 also have an inner wall 52a and an outer wall 52b separated by an annular zone 52c. However, this annular zone is sealed in this case at the lower end of inner tube 52a, which is also positioned above the lower end of outer tube 52b. However, zone 52c is open towards the top at the tube plate 48.

In this case, the steam generator dome 60 is eliminated and replaced by a cylindrical ferrule 146 extending wall 51 in the upwards direction and opening at its upper end into the reactor building. Thus, zone 52c is filled with a gas at atmospheric pressure and generally by the air above the steam generator. Ferrule 146 supports tube plates 151 to which are connected intake pipes 150. The inner walls 52a of the inner tubes 52 are extended above the upper tube plate 48 and are connected to tube plates 151, a certain number of walls 52a being fixed to each of the plates.

FIG. 5 also shows a second variant for the supporting of the steam generator, in which the latter is suspended on slab 12. In this case, the widened wall 74 has at its lower end a flange 92 resting on a flange 94 fixed to slab 12 around opening 38.

In practice and although this is shown in the drawings, it is desirable to have a centering of the inner tubes 52 within the intermediate tubes 58, as well as a centering of the latter within the outer tubes 68. This centering can be brought about by any appropriate known means and particularly as a result of helical devices fixed to the outside of tubes 52, 58, at least in the lower part thereof, permitting the upward flow of the steam and the helium and improving the heat exchange.

The following remarks can be made regarding the dimensioning of tube plates 48, 54, 64. The upper tube plate 48 is traversed by small diameter inner tubes 52. It is at a moderate temperature corresponding to the temperature of the feed water on entry, i.e. approximately 260° C. Finally, it is subject to a service pressure corresponding to the pressure drop of the water/steam circuit. Thus, plate 48 has a moderate thickness.

The intermediate tube plate 54 is traversed by intermediate tubes 58 having modest dimensions compared with the spacing of the system. This plate is subject to a mean operating pressure corresponding to the pressure difference between helium and steam, for a moderate temperature of approximately 450° C. corresponding to the steam discharge temperature. It is consequently slightly thicker than tube plate 48.

Finally, the lower tube plate 64 is the only one which is perforated with the diameter of the outer tube 68. It is exposed to temperature and pressure conditions closed to those of the intermediate tube plate 54 (differential pressure approx. 7 MPa and helium discharge temperature substantially below 500° C.). Thus, it should be noted that the helium temperature drops by about 50° between the sodium level and the tube plate 64, due to the helium/steam heat exchange taking place over close to 3 meters. This phenomenon is very favourable for the behaviour of the tube plate 64.

It has already been pointed out that the steam generator 32 used in the reactor according to the invention has a generally vertically axed cylindrical configuration. However, it is apparent from the preceding description, that there is a problem of fitting the vertical parts 72a of the helium supply tube 72 relative to the generator tubular cells. In a preferred, but not limitative configuration according to FIG. 6, this is brought about by providing within the ferrule 80 which has a generally cylindrical configuration, three passage zones 83 for the tubes 72 extending over the entire height of ferrule 80 and at 120° from one another. The zones 83, which have a substantially triangular cross-section, are defined by the cylindrical ferrule 80 and by vertical partitions 81 having a V-shaped section. More specifically, the branches of the V formed in section by each of the partitions 81 are parallel to the adjacent branches of two other partitions 81.

Figure 6:
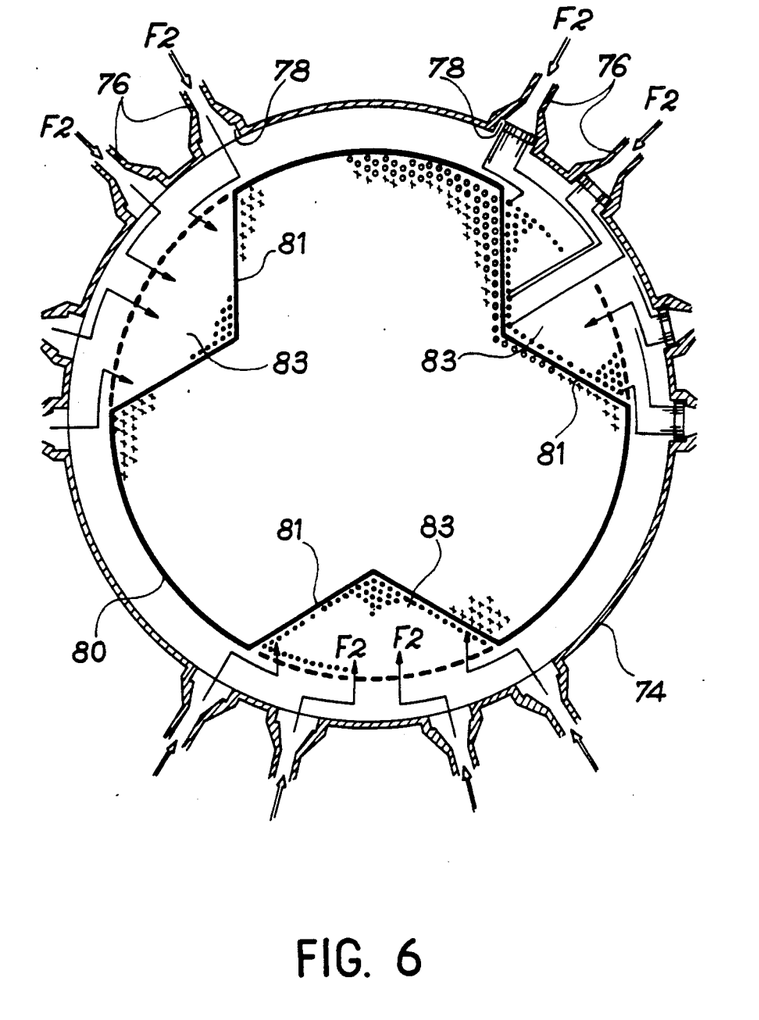
FIG. 6 a cross-sectional view of the steam generator along line VI—VI of FIG. 3.

Thus, the group of tubular cells has in section the shape of a star with three branches. It should be noted that the distribution of tubes on plates 48, 54 and 64 is favourable from the dimensioning standpoint.

Preferably, in order to avoid a parasitic heat exchange between the hot sodium entering the upper part of ferrule 80 and the cooled sodium leaving the lower part thereof, the zones 83 housing the helium supply tubes 72 are maintained under an atmosphere corresponding to that of the neutral gas covering 24 of the reactor. This result is obtained by sealing the lower end of each of the zones 83 by a wall tightly traversed by tubes 72. Moreover, said zones 83 acn be thermally insulated with respect to the interior of ferrule 80, as a result of appropriate, not shown thermal insulation systems. Another solution consists of allowing the sodium to flow out at a reduced speed in said zones, whilst heating the descending helium. There is scarcely any difference between the zones and other zones located in the sodium vessel.

The steam generator integrated with the reactor vessel according to the invention consequently has a structure such that all the fluids descending into the main vessel are contained in tubular structures which are simple when considered in isolation, said structures being moderately stressed under well known and highly divided conditions, which considerably reduces the risks linked with cracks and possible leaks. Moreover, leak detection is easy, e.g. by checking the neutral gas atmosphere in the steam generator, above sodium level N' and which would be entered by the helium from leaks or in the neutral gas covering of the reactor.

Moreover, apart from its functions of transferring heat and acting as an intermediate medium between the sodium and the steam, the helium acts as a heat absorber between these two fluids, which is important for fast neutron reactors.

Figure 7:
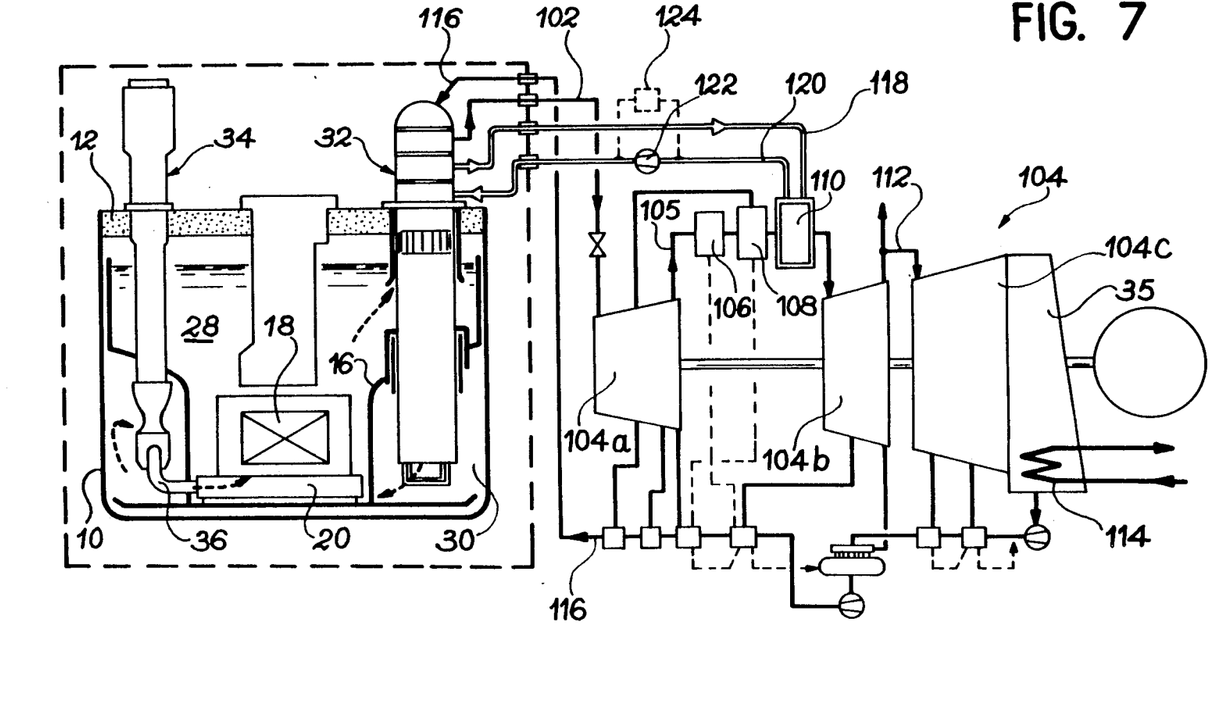
FIG. 7 a diagrammatic view showing the neutral gas circuit and the water/steam circuit of the reactor according to the invention.

FIG. 7 shows diagrammatically and in a non-limitative manner, all the water/steam and helium circuits of the reactor 5 according to the invention.

The water/steam circuit comprises a steam pipe 102 by which the steam discharge pipe 56 of each of the steam generators 32 communicates with the high pressure stage 104a of a steam turbine and which also has a medium pressure stage 104b and a low pressure stage 104c. The steam leaving the high pressure stage 104a by a pipe 105 traverses a drier 106, a medium pressure resuperheater 108 by drawing off steam and a resuperheater 110 by helium, before being directed to the medium pressure stage 104b of the turbine. Finally, the steam is directed to the low pressure stage 104c by a pipe 112 before being condensed in a condenser 35. The condensation water returns to the intake pipes 50 of steam generators 52 by a duct 116.

According to the interesting feature of the invention, the resuperheater 110 traversed by the steam introduced into the medium pressure stage 104b of the turbine simultaneously cools the helium circulating in the intermediate circuit of the steam generators 32. To this end, FIG. 7 shows that the helium circuit comprises a duct 118 connecting the helium discharge pipes 66 of the steam generators to the intake of the resuperheater 110 and a return duct 120 connecting the outlet of the resuperheater 110 to the helium intake pipes 76 of the steam generators. The helium circulation is controlled by a blower 122 arranged in the return duct 120. A system 124 for the treatment and in particular the drying of the helium is connected in parallel on blower 122.

Figure 8:
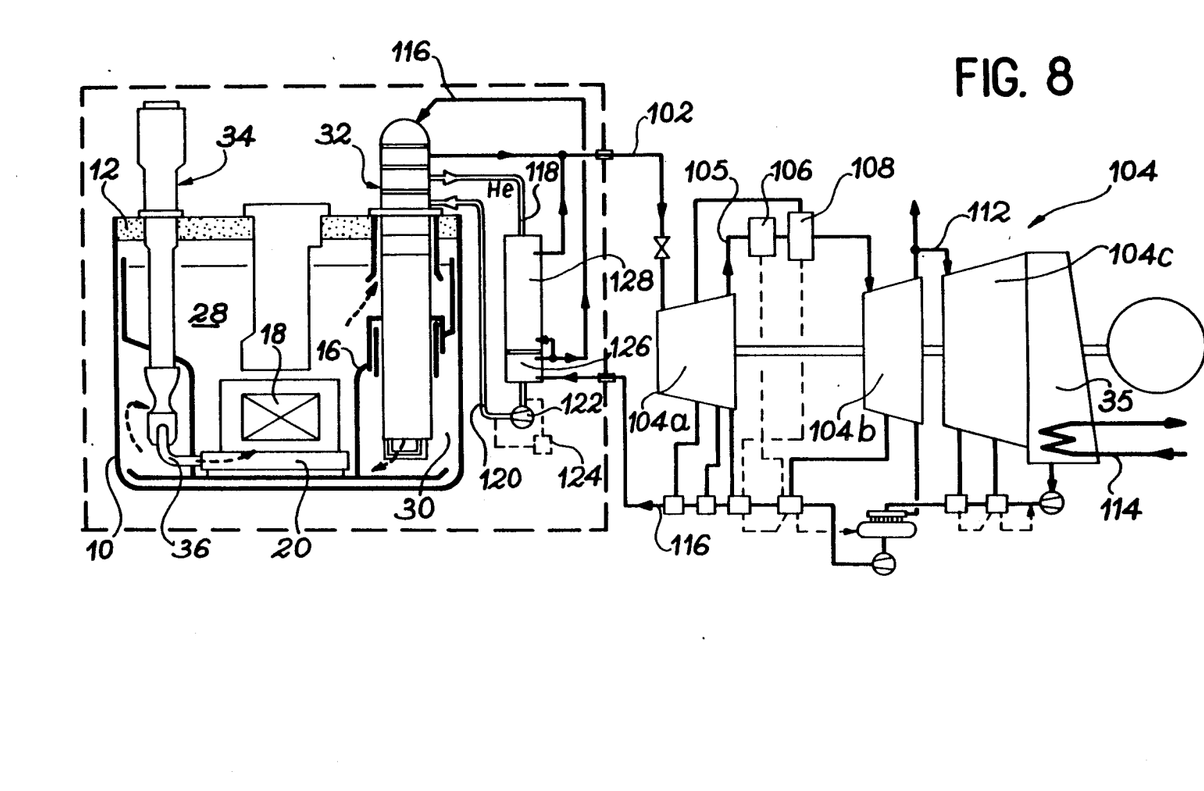
FIG. 8 a diagrammatic view comparable to FIG. 7 showing a variant, in which the neutral gas circuit is disposed within the reactor building.

According to a variant of the above arrangement, another use of the heat carried by the helium is proposed. This is shown in FIG. 8, where it is possible to see a neutral gas circuit integrated into the reactor building and used for a supplementary reheating of the feed water and a supplementary production of live steam. This circuit comprises a water heater 126 and an additional steam generator 128.

The use of helium in the intermediate circuit of steam generators is of particular interest. Thus, this gas is chemically neutral and reacts neither with the sodium nor with the water. Moreover, it does not require the use of steels differing from those normally used at the high operating temperatures of a steam generator. Finally, it has good thermal and thermodynamic characteristics. In particular, its thermal conductivity is much higher than that of air or carbon dioxide gas and its specific heat is more than four times that of liquid sodium whereas its specific gravity is 120 to 150 times lower. Helium can be used on an industrial scale and its flow is only slightly prejudicial to structures. Moreover, in the special case of the invention in which the steam generator is integrated into the reactor vessel, it has the advantage of not absorbing neutrons.

What is claimed is:

1. A fast neutron nuclear reactor comprising: a primary circuit integrated into a reactor vessel filled with liquid metal and containing a reactor core of the reactor, means for circulating the liquid metal, means for transferring the heat carried by the liquid metal to water circulating in a water/steam circuit, the heat transferring means comprising at least one steam generator located in the reactor vessel and having at least one group of inner tubes in which circulates the water of the water/steam circuit, at least one group of outer tubes immersed in the liquid metal of the primary circuit, the outer tubes respectively surrounding the inner tubes in order to define therewith an annular space under a pressurized neutral gas and connected to a secondary circuit with a low thermal power having means for circulating the pressurized neutral gas in said annular space and for ensuring heat exchange, said reactor vessel being sealed by a horizontal sealing slab tightly passing through the steam generator, the steam generator having above said slab an upper tube plate supporting the group of inner tubes, the inner tubes being open at inner ends thereof, an intermediate tube plate surmounted by a steam discharge chamber of the water/steam circuit and supporting a group of intermediate tubes surrounding the inner tubes and being closed at lower ends thereof and into the lower ends of which issue the inner tubes, and a lower tube plate surmounted by a neutral gas discharge and supporting the group of outer tubes, said outer tubes surrounding the intermediate tubes, the steam generator also having neutral gas tubes connecting bottoms of the outer tubes to neutral gas inlet ports located between the lower tube plate and the sealing slab, said neutral gas tubes being provided below the bottoms of the outer tubes with a substantially horizontal portion serving to compensate for differential expansions.

2. A reactor according to claim 1, wherein the steam generator has, below the lower tube plate, a liquid metal confinement ferrule encircling the groups of fitted inner, intermediate and outer tubes, said ferrule having an intake for the liquid metal located above the normal level of the liquid metal in the reactor vessel and is open at its lower end to permit the outflow of liquid metal.

3. A reactor according to claim 2, wherein the ferrule also has, below the normal level of the liquid metal in the reactor vessel, a normally closed entry window, means controlling the opening of said window when the liquid metal circulating means are stopped, so as to permit the circulation of the liquid metal within the ferrule by natural convection and its cooling by heat exchange with the neutral gas circulating in the annular space.

4. A reactor according to claim 2, wherein the ferrule has, below the normal level of the liquid metal in the reactor vessel, calibrated openings in order to permit the circulation of the liquid metal within the ferrule by natural convection and its cooling by heat exchange with the neutral gas circulating in the said annular space, when the liquid metal circulating means are stopped.

5. A reactor according to claim 1, wherein the ferrule is generally shaped like a vertically axed cylinder of revolution and defines with the inner wall at least one zone extending over its entire height and into which descends the vertical parts of the neutral gas tubes.

6. A reactor according to claim 1, wherein each of the inner tubes has two coaxial walls defining between them an annular zone closed at one of its ends and filled with a static fluid forming a heat shield.

7. A reactor according to claim 6, wherein the upper tube plate is surmounted by a water intake chamber of the water/steam circuit.

8. A reactor according to claim 7, wherein the annular zone is closed at its upper end, open at its lower end and filled with stagnant steam/water.

9. A reactor according to claim 6, wherein the upper tube plate forms the upper base of the steam generator, the inner walls of the inner tube extending above the upper tube plate to issue into water inlets of the steam/water circuit.

10. A reactor according to claim 9 wherein the annular zone is closed at its lower end, open at its upper end and filled with a stagnant gas above the reactor slab.

11. A reactor according to claim 6 wherein the lower end of the inner wall of each of the inner tubes is positioned above the lower end of the outer wall of each of these tubes.

12. A fast neutron nuclear reactor comprising: a primary circuit integrated into a reactor vessel filled with liquid metal and containing a reactor core of the reactor, means for circulating the liquid metal, means for transferring the heat carried by the liquid metal to water circulating in a water/steam circuit, the heat transferring means comprising at least one steam generator located in the reactor vessel and having at least one group of inner tubes in which circulates the water of the water/steam circuit, at least one group of outer tubes immersed in the liquid metal of the primary circuit, the outer tubes respectively surrounding the inner tubes in order to define therewith an annular space under a pressurized neutral gas and connected to a secondary circuit with a low thermal power having means for circulating the pressurized neutral gas in said annular space and for ensuring heat exchange, said reactor vessel being sealed by a horizontal sealing slab tightly passing through the steam generator, the steam generator having above said slab an upper tube plate supporting the group of inner tubes, the inner tubes being open at inner ends thereof, an intermediate tube plate surmounted by a steam discharge chamber of the water/steam circuit and supporting a group of intermediate tubes surrounding the inner tubes and being closed at lower ends thereof and into the lower ends of which issue the inner tubes, and a lower tube plate surmounted by a neutral gas discharge and supporting the group of outer tubes, said outer tubes surrounding the intermediate tubes, the steam generator also having neutral gas tubes connecting bottoms of the outer tubes to neutral gas inlet ports located between the lower tube plate and the sealing slab, said neutral gas tubes being provided below and bottoms of the outer tubes with a substantially horizontal portion serving to compensate for differential expansions, said steam generator having a dismantlable part comprising the upper tube plate, the lower tube plate, the intermediate tube plate, the steam discharge chamber and the group of intermediate tubes.

* * * * *